US008203548B2

(12) United States Patent
Nagatomo et al.

(10) Patent No.: US 8,203,548 B2
(45) **Date of Patent: *Jun. 19, 2012**

(54) DRIVING CIRCUIT

(75) Inventors: Shigeru Nagatomo, Miyazaki (JP); Akira Nakayama, Miyazaki (JP); Akihiro Sushihara, Miyazaki (JP)

(73) Assignee: Oki Semiconductor Co., Ltd., Toyko (JP)

( * ) Notice: Subject to any disclaimer, the term of this patent is extended or adjusted under 35 U.S.C. 154(b) by 1228 days.

This patent is subject to a terminal disclaimer.

(21) Appl. No.: 11/762,250

(22) Filed: Jun. 13, 2007

(65) Prior Publication Data

US 2008/0018633 A1 Jan. 24, 2008

(30) Foreign Application Priority Data

Jul. 20, 2006 (JP) ................................ 2006-197709

(51) Int. Cl.
*G09G 3/36* (2006.01)
*G09G 5/00* (2006.01)
*G06F 3/038* (2006.01)

(52) U.S. Cl. ........... 345/208; 345/90; 345/100; 345/204

(58) Field of Classification Search .................... 345/53, 345/89, 90, 92, 94, 98, 100, 104, 204, 205, 345/690

See application file for complete search history.

(56) References Cited

U.S. PATENT DOCUMENTS 5,731,796 A * 3/1998 Furuhashi et al. .............. 345/96
6,127,995 A * 10/2000 Furuhashi et al. .............. 345/96
6,256,025 B1 * 7/2001 Imai et al. ...................... 345/211
6,310,616 B1 * 10/2001 Yanagi et al. ................. 345/211
6,323,851 B1 * 11/2001 Nakanishi ...................... 345/211
6,392,629 B1 * 5/2002 Murakami et al. .............. 345/98
6,498,596 B1 * 12/2002 Nakamura et al. .............. 345/98
7,079,127 B2 * 7/2006 Morita .......................... 345/212
7,224,333 B2 * 5/2007 Yamazaki et al. .............. 345/82
7,307,610 B2 * 12/2007 Sakaguchi ...................... 345/89
7,324,079 B2 * 1/2008 Tobita ........................... 345/100
7,365,713 B2 * 4/2008 Kimura ........................... 345/76
7,463,254 B2 * 12/2008 Shino et al. ................... 345/204
7,479,937 B2 * 1/2009 Shimoda .......................... 345/76
7,595,776 B2 * 9/2009 Hashimoto et al. ............. 345/76
2002/0145600 A1 * 10/2002 Morita .......................... 345/211

(Continued)

FOREIGN PATENT DOCUMENTS

JP 2000-165244 6/2000

(Continued)

*Primary Examiner* — Abbas Abdulselam
*Assistant Examiner* — Aaron M Guertin
(74) *Attorney, Agent, or Firm* — Volentine & Whitt, PLLC

(57) ABSTRACT

A driving circuit of a display device is provided. In a first time period of a data writing period, a control section of the driving circuit effects control so as to short-circuit a first node which is set to a target gradation potential and a node (second node) adjacent to the first node, and such that a line (second line) between the second node and a hold capacitor of a pixel is connected in parallel to a line (first line) between the first node and the hold capacitor of the pixel. Further, in a second time period following the first time period, the control section controls switching element groups so as to cancel short-circuiting between the first node and the second node, and such that the second line is not connected in parallel to the first line.

1 Claim, 8 Drawing Sheets

U.S. PATENT DOCUMENTS

| | | | | |
|---|---|---|---|---|
| 2002/0186231 | A1* | 12/2002 | Kudo et al. | 345/690 |
| 2004/0021627 | A1* | 2/2004 | Maki | 345/89 |
| 2004/0179029 | A1* | 9/2004 | Ogawa et al. | 345/690 |
| 2004/0257388 | A1* | 12/2004 | Tobita | 345/690 |
| 2005/0057470 | A1* | 3/2005 | Tobita | 345/89 |
| 2005/0225573 | A1* | 10/2005 | Kudo et al. | 345/690 |
| 2005/0231452 | A1* | 10/2005 | Tobita | 345/87 |
| 2007/0057897 | A1* | 3/2007 | Tobita | 345/98 |
| 2007/0080905 | A1* | 4/2007 | Takahara | 345/76 |
| 2008/0018633 | A1* | 1/2008 | Nagatomo et al. | 345/208 |
| 2008/0117195 | A1* | 5/2008 | Miyamoto | 345/205 |

FOREIGN PATENT DOCUMENTS

| | | |
|---|---|---|
| JP | 2005-010276 | 1/2005 |

* cited by examiner

DRIVING CIRCUIT

CROSS-REFERENCE TO RELATED APPLICATION

This application claims priority under 35 USC 119 from Japanese Patent Application No. 2006-197709, the disclosure of which is incorporated by reference herein.

BACKGROUND OF THE INVENTION

1. Field of the Invention

The present invention relates to a driving circuit which drives data lines in a display device for multigradation display of pixels.

2. Description of the Related Art

In active matrix liquid crystal display devices, which are the mainstream of liquid crystal display devices, pixels are selectively driven in units of pixels (dot sequential driving) or in units of rows (line sequential driving).

In an active matrix liquid crystal display device, pixels containing liquid crystal cells are arranged in the form of a matrix. Each pixel includes a thin film transistor (TFT), and a hold (retentive) capacitor which is connected in parallel to the liquid crystal cell. The hold capacitor is provided between the drain of the TFT and a predetermined common potential, and the source of the TFT is connected to a corresponding data line.

In the active matrix liquid crystal display devices disclosed in Japanese Patent Applications Laid-Open (JP-A) Nos. 2000-165244 and 2005-010276, the scan line is successively selected by a gate driver, and the TFTs of all of the pixels connected to the selected scan line (row) are turned on. While the TFTs of the selected row are on, gradation potentials corresponding to display data are supplied from a source driver via the data line to one ends of the hold capacitors of the pixels. The hold capacitors hold (retain), during the time period of a frame, the charges accumulated via the data line.

In recent years, as the size of liquid crystal panels has increased (i.e., as the number of data lines has increased), the circuit scale of the driving circuit which serves as the source driver which drives the TFTs has increased. Because the number of lines within the driving circuit thereby increases, the resistance (wiring resistance) parasitic on the lines increases, and the charging time period of the gradation voltage with respect to the hold capacity within the pixel becomes long. Accordingly, due to the size of liquid crystal panels increasing in recent years, the writing period to the pixels within the panels has not been able to be sufficiently ensured.

On the other hand, increasing the size of the chip for forming the driving circuit in order to reduce the wiring resistance is not preferable from the standpoint of costs.

For the above reasons, in the driving circuit of a display device, it has been desired to shorten the writing period to the pixels while avoiding an increase in the chip size.

SUMMARY OF THE INVENTION

An aspect of the present invention is a driving circuit outputting, from output terminals, gradation potentials corresponding to display data, the driving circuit including: a gradation setting section setting, on the basis of a reference potential, a plurality of respectively different gradation potentials at a plurality of nodes; a plurality of amplifiers provided at the plurality of nodes respectively; potential selecting sections provided respectively in correspondence with the output terminals, and, during a data writing period, the potential selecting section selects, from among the plurality of gradation potentials, a target gradation potential corresponding to the display data, and outputs the target gradation potential from the amplifier to the output terminal; and a control section effecting control such that, (a) during a first time period of the data writing period, a first node set to the target gradation potential and a second node adjacent to the first node are short-circuited, and a second line between the second node and the output terminal is connected in parallel to a first line between the first node and the output terminal, and, (b) during a second time period which follows the first time period, short-circuiting between the first node and the second node is cancelled and the second line is not connected in parallel to the first line.

In accordance with the driving circuit of the present aspect, in the first time period, the second line between the second node and the output terminal is connected in parallel to the first line between the first node and the output terminal. Therefore, the parasitic resistance between the target gradation potential (first node) and the output terminal decreases, as compared with the case of only the first line. In this way, the time constant of the circuit between the target gradation potential and the output terminal is shortened.

On the other hand, in a case in which the second node is set to a potential which is higher than the target gradation potential (first node), the potential of the output terminal changes transiently during the first time period toward the potential of the second node. Therefore, at the point in time of the start of the second time period, the potential of the output terminal becomes a value which is close to the target gradation potential.

In accordance with the present invention, the writing period to a pixel is shortened as compared with conventional structures. Further, as compared with conventional structures, there are no additional structural elements, and an increase in the size of the chip structuring the driving circuit can be avoided.

BRIEF DESCRIPTION OF THE DRAWINGS

Exemplary embodiments of the present invention will be described in detail based on the following figures, wherein.

DETAILED DESCRIPTION OF THE INVENTION

First Exemplary Embodiment (Overall Structure of Liquid Crystal Display Device)

Figure 1:
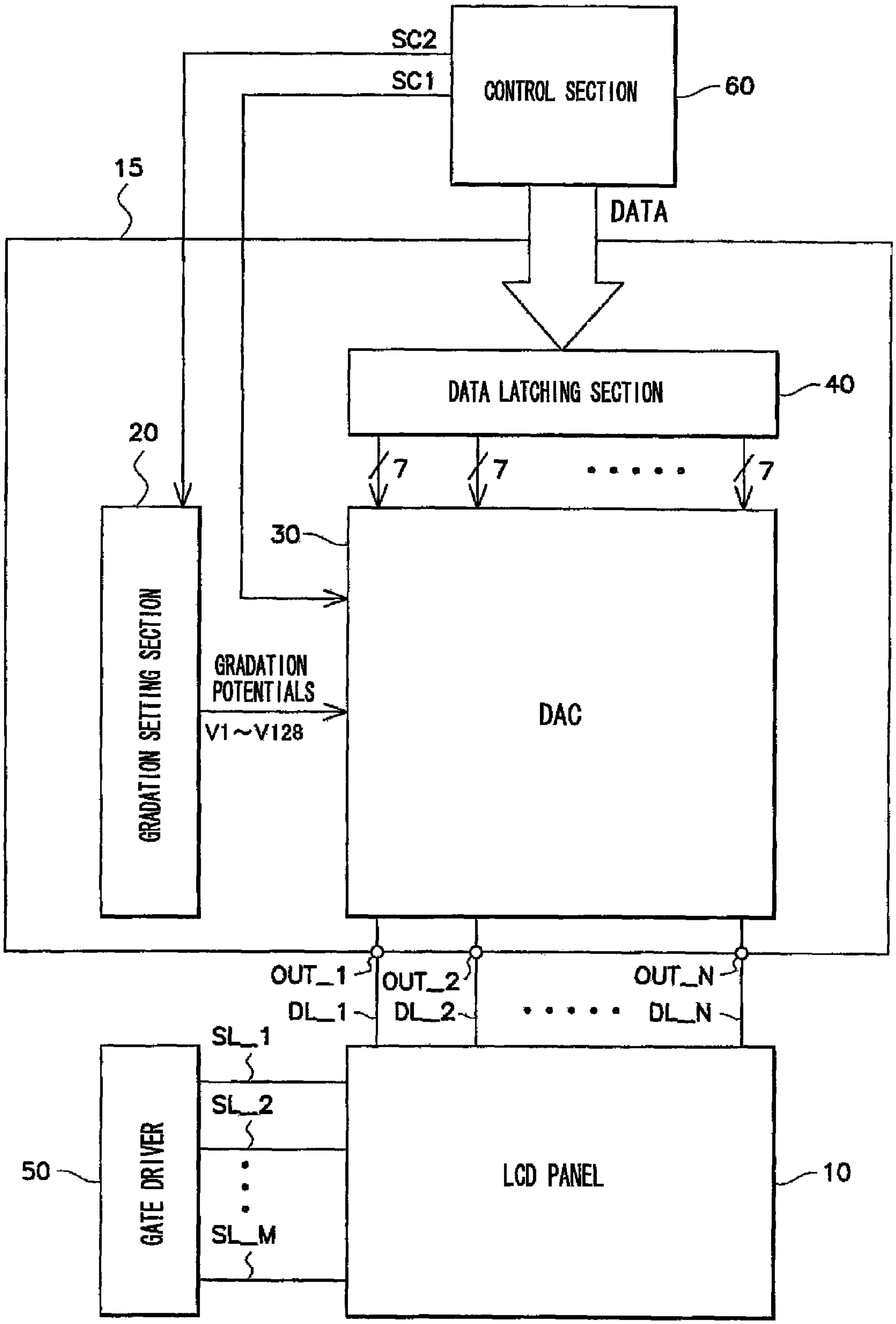
FIG. 1 is a block diagram showing the structure of a liquid crystal display device to which a driving circuit relating to a first exemplary embodiment is applied.

First, the overall structure of a liquid crystal display device, to which a driving circuit relating to an exemplary embodiment of the present invention is applied, will be described with reference to FIG. 1. FIG. 1 is a block diagram showing the structure of the liquid crystal display device.

Note that, in the present exemplary embodiment, explanation is given by using as an example a liquid crystal display device which processes display data of 128 gradations (7 bits). However, the present exemplary embodiment can easily be expanded to display data of different numbers of gradations (data other than 7 bits).

As shown in FIG. 1, the liquid crystal display device has a liquid crystal display panel (LCD panel) 10, a source driver 15, a gate driver 50, and a control section 60. Note that the source driver 15 and the control section 60 structure the exemplary embodiment of the driving circuit of the present invention.

Pixels (not shown) are arranged in the form of a matrix of M rows and N columns at the LCD panel 10. The pixels which are arranged in the form of a matrix are connected to and driven by M scan lines (SL_1, SL_2, . . . , SL_M) and N data lines (DL_1, DL_2, . . . . DL_N).

Each pixel includes a thin film transistor (TFT) and a hold capacitor Cs which is connected in parallel to a liquid crystal cell. The hold capacitor Cs is provided between the drain of the TFT and a predetermined common potential, and holds accumulated charges during a frame time period. Further, the source of the TFT is connected to the corresponding data line.

In this liquid crystal display device, the scan lines are successively selected by the gate driver 50, and the TFTs of all of the pixels connected to the selected scan line (row) are turned on. While the TFTs of the selected row are on, gradation potentials corresponding to display data are supplied to the pixels (hold capacitors) of that row from output terminals (OUT_1, OUT_2, . . . , OUT_N) of the source driver 15 via the data lines. The output terminals of the source driver 15 correspond to the output terminals of the driving circuit of the present invention.

The control section 60 is a control section for controlling the source driver 15. The control section 60 successively sends display data (DATA), which is taken-in from the exterior, out to the source driver 15, and controls the source driver 15 by switch control signals SC1, SC2.

The structure of the source driver 15 and the contents of control of the control section 60 will be described hereinafter in that order.

(Structure of Source Driver)

Figure 2:
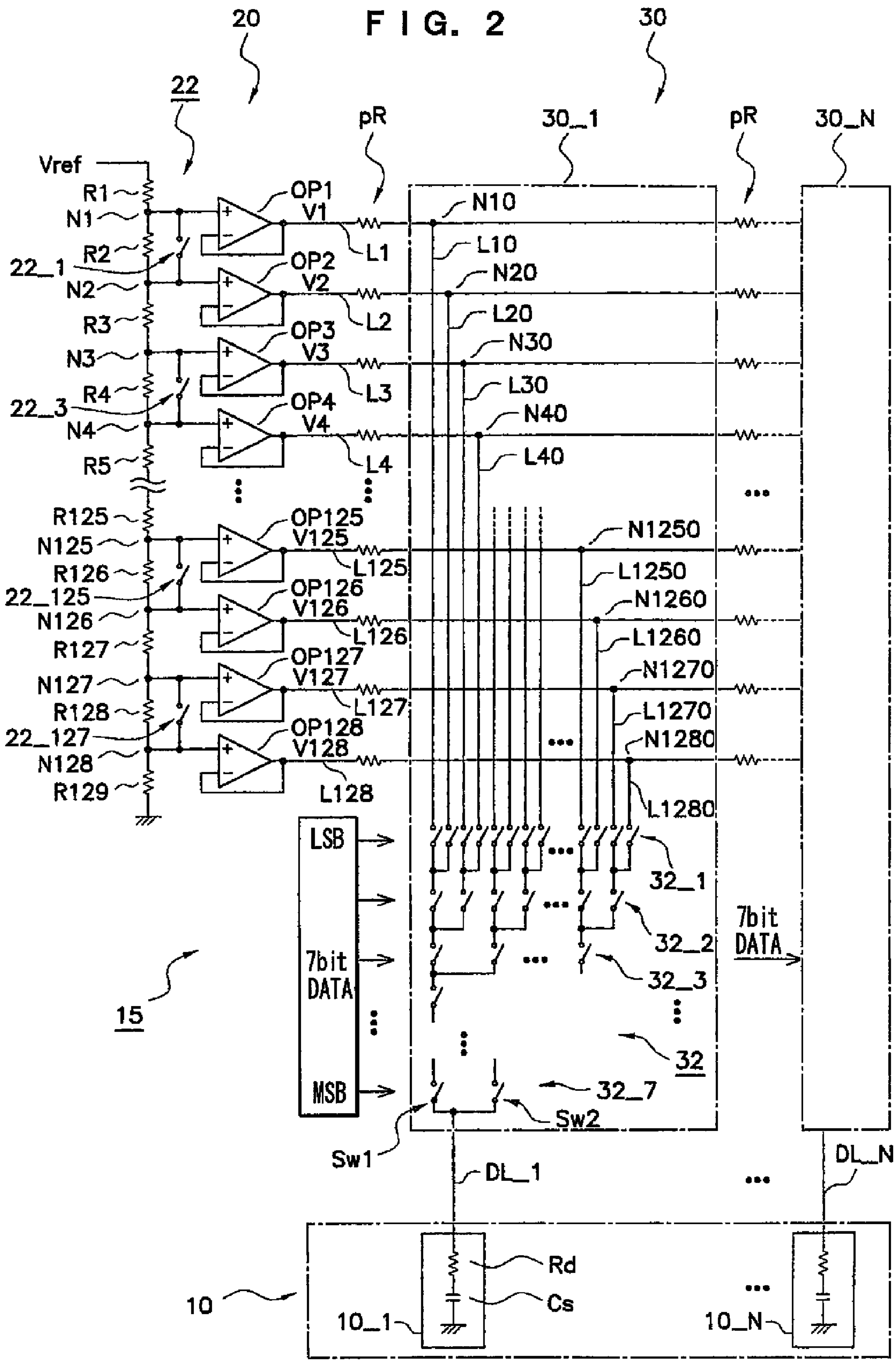
FIG. 2 is a drawing exemplifying a partial circuit structure of a source driver structuring the driving circuit relating to the first exemplary embodiment.

Next, a concrete example of the circuit structure of the source driver 15 will be described with reference to FIG. 1 and FIG. 2. FIG. 2 is a drawing exemplifying a partial circuit structure of the source driver 15. Note that, in FIG. 2, illustration of the output terminals (OUT_1, OUT_2, . . . , OUT_N) of the source driver 15 is omitted.

As shown in FIG. 1, the source driver 15 has a gradation setting section 20, a digital-analog converting section (DAC) 30 serving as a potential selecting section, and a data latching section 40.

Synchronously with a strobe signal (not shown) from the control section 60, the data latching section 40 reads-in and latches display data from the control section 60, and outputs 7-bit display data to the DA converting section 30 in correspondence with the respective data lines.

The gradation setting section 20 generates gradation potentials V1 through V128 on the basis of a predetermined reference potential. The DA converting section 30 selects the gradation potential (analog data) corresponding to the 7-bit display data (digital data) from among the gradation potentials V1 through V128, and sends the selected gradation potential out to the data line.

Next, the structures of the gradation setting section 20 and the DA converting section 30, among the structures of the source driver 15, will be described in further detail with reference to FIG. 2. Note that, in FIG. 2, for simplicity, only pixels 10_1 through 10_N of one row within the LCD panel 10 are illustrated, and, at each pixel, an on resistor Rd of the TFT is illustrated in addition to the hold capacitor Cs.

In FIG. 2, the gradation setting section 20 includes resistors R1 through R129, operation amplifiers OP1 through OP128 (plural amplifiers), and a switching element group 22 (second switching element group).

The resistors R1 through R129 are resistors for generating gradation potentials, and are provided in series between a reference potential Vref and a ground potential. In this way, gradation potentials V1, V2, . . . , V128 (V1>V2> . . . >V128) are provided respectively to the nodes between the respective resistors, i.e., node N1 between resistor R1 and resistor R2, node N2 between resistor R2 and resistor R3, . . . , node N128 between resistor R128 and resistor R129. Note that, in order to carry out gamma correction at the gradation setting section 20, for example, the resistor R1 and the resistor R129 may be made to be variable resistors, and the resistance values of the resistor R1 and/or the resistor R129 may be changed on the basis of control signals from the control section 60.

The operation amplifiers OP1 through OP128 are provided in correspondence with the above-described nodes, respectively. Namely, the non-inverting input terminals (+) of the operation amplifiers OP1, OP2, . . . , OP128 and the nodes N1, N2, . . . , N128 are connected respectively. At the operation amplifiers OP1, OP2, . . . , OP128, the inverting input terminals (−) and the output terminals are connected. In this way, each operation amplifier structures a voltage follower for carrying out impedance conversion, and, when the gradation potential is applied to the pixel, a voltage drop due to the supply of current is prevented.

As shown in FIG. 2, the switching element group 22 includes a switching element 22_1 provided between node N1 and node N2, a switching element 22_3 provided between node N3 and node N4, . . . , a switching element 22_125 provided between node N125 and node N126, and a switching element 22_127 provided between node N127 and node N128. Opening and closing of the respective switching elements of the switching element group 22 are controlled by the switch control signal SC2 from the control section 60.

At the DA converting section 30 which serves as the potential selecting section, plural DA converters 30_1 through 30_N are provided in correspondence with the pixels which are arranged in the column direction within the LCD panel 10, and gradation potentials corresponding to the display data are supplied to the hold capacitors Cs of the corresponding pixels via the data lines. In FIG. 2, the DA converters 30_1 through 30_N supply gradation potentials to pixels 10_1 through 10_N respectively via data lines DL_1 through DL_N.

The respective DA converters are structured between lines L1 through L128, which are provided at the output terminals of the operation amplifiers OP1 through OP128, and the corresponding data lines. Because the structures of the respective DA converters are all the same, hereinafter, only the structure of the DA converter 30_1 will be described.

The DA converter 30_1 includes a switching element group 32 (first switching element group). The opening and closing of the switching element group 32 are controlled in accordance with 7-bit display data (digital data), and the switching element group 32 converts this display data into a gradation potential (analog data) and outputs it to the data line DL_1.

The switching element group 32 is formed from switching element groups 32_1 through 32_7. Each switching element group is structured so as to include one or plural pairs of switching elements. Of the switching elements which form a pair (hereinafter called SW1, SW2), one is opened and the other is short-circuited in accordance with the level of the corresponding bit.

For example, as shown in FIG. 2, the switching element group 32_7 has one set of the pair of switching elements SW1 (the switching element at the left side in FIG. 2) and SW2 (the switching element at the right side in FIG. 2). When the level of the MSB (Most Significant Bit) of the display data is "0", the switching element SW1 short-circuits and the switching element SW2 opens, whereas when the level thereof is "1", the switching element SW1 opens and the switching element SW2 short-circuits.

Similarly, the switching element group 32_6 (not illustrated) has two sets of the pair of switching elements (SW1, SW2). When the second level from the MSB in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

The switching element group 32_5 (not illustrated) has four sets of the pair of switching elements (SW1, SW2). When the third level from the MSB in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

The switching element group 32_4 (not illustrated) has eight sets of the pair of switching elements (SW1, SW2). When the fourth level from the MSB in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

The switching element group 32_3 has 16 sets of the pair of switching elements (SW1, SW2). When the fifth level from the MSB in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

The switching element group 32_2 has 32 sets of the pair of switching elements (SW1, SW2). When the sixth level from the MSB in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

The switching element group 32_1 has 64 sets of the pair of switching elements (SW1, SW2). When the level of the LSB (Least Significant Bit) in the 7-bit display data is "0", at all of the sets, the switching element SW1 short-circuits and the switching element SW2 opens, whereas when the level thereof is "1", at all of the sets, the switching element SW1 opens and the switching element SW2 short-circuits.

As shown in FIG. 2, the switching element groups 32_1 through 32_7 are connected by a tree structure in order toward the data line DL_1.

One ends (the ends which are not connected to the switching element group 32_2) of the 128 switching elements (the 64 groups of switching element pairs) of the switching element group 32_1 are connected to nodes N10 through N1280 on the lines L1 through L128 respectively, by lines L10 through L1280.

In FIG. 2, parasitic resistors pR exist at the lines L1 through L128 within the source driver 15. Further, the parasitic resistors pR (not shown) exist also at the lines L10 through L1280 within the source driver 15.

(Contents of Control by Control Section)

The contents of the controlling of the source driver 15 by the control section 60 will be described next.

In a conventional driving circuit, during the period of the supply of the gradation potential by the data line (the data writing period), the open/closed states of the switching element group 32 are fixed in accordance with the display data. However, in an initial time period (hereinafter called first time period) in the data writing period, the control section 60 in the present exemplary embodiment sets the switching element group 32 in open/closed states corresponding to the display data, and, in addition, short-circuits (sets in closed states) the entire switching element group 32_1 corresponding to the low-order one bit (LSB) of the display data by the switch control signal SC1 regardless of the display data.

Further, in the first time period, the control section 60 short-circuits (sets in a closed state) the switching elements in the switching element group 22 by the switch control signal SC2, so that the node of the target gradation potential corresponding to the display data, and the node of the gradation potential corresponding to data in which only the low-order one bit (LSB) differs from the display data, are connected. For example, in a case in which the target gradation potential corresponding to the display data is V3, because the switching element 22_3 connected to the node N3 is short-circuited, the node N3 and the node N4 become the same potential.

Note that, in the following description, the above-described switching control which short-circuits the switching elements other than the switching elements which are opened and closed in accordance with the display data, is called the "short-circuit control mode". This short-circuit control mode is carried out only in the first time period.

In the time period (hereinafter called second time period) after the first time period and during the data writing period, the control section 60 cancels the short-circuiting of the first time period. Accordingly, in the second time period, the short-circuit control mode is not carried out, and the switching element group 32 is set in open and closed states corresponding to the display data.

The control section 60 decides on the switching from the first time period to the second time period during the data writing period, in accordance with the change in the level of an internal enable signal EN. Namely, in the first time period in which the enable signal EN is high level (H level), the above-described short circuit control mode is carried out. During the second time period, which is from the point in time when the enable signal EN changes from high level to low level (L level), the above-described short-circuit control mode is not carried out.

(Operation of Driving Circuit)

Figure 3:
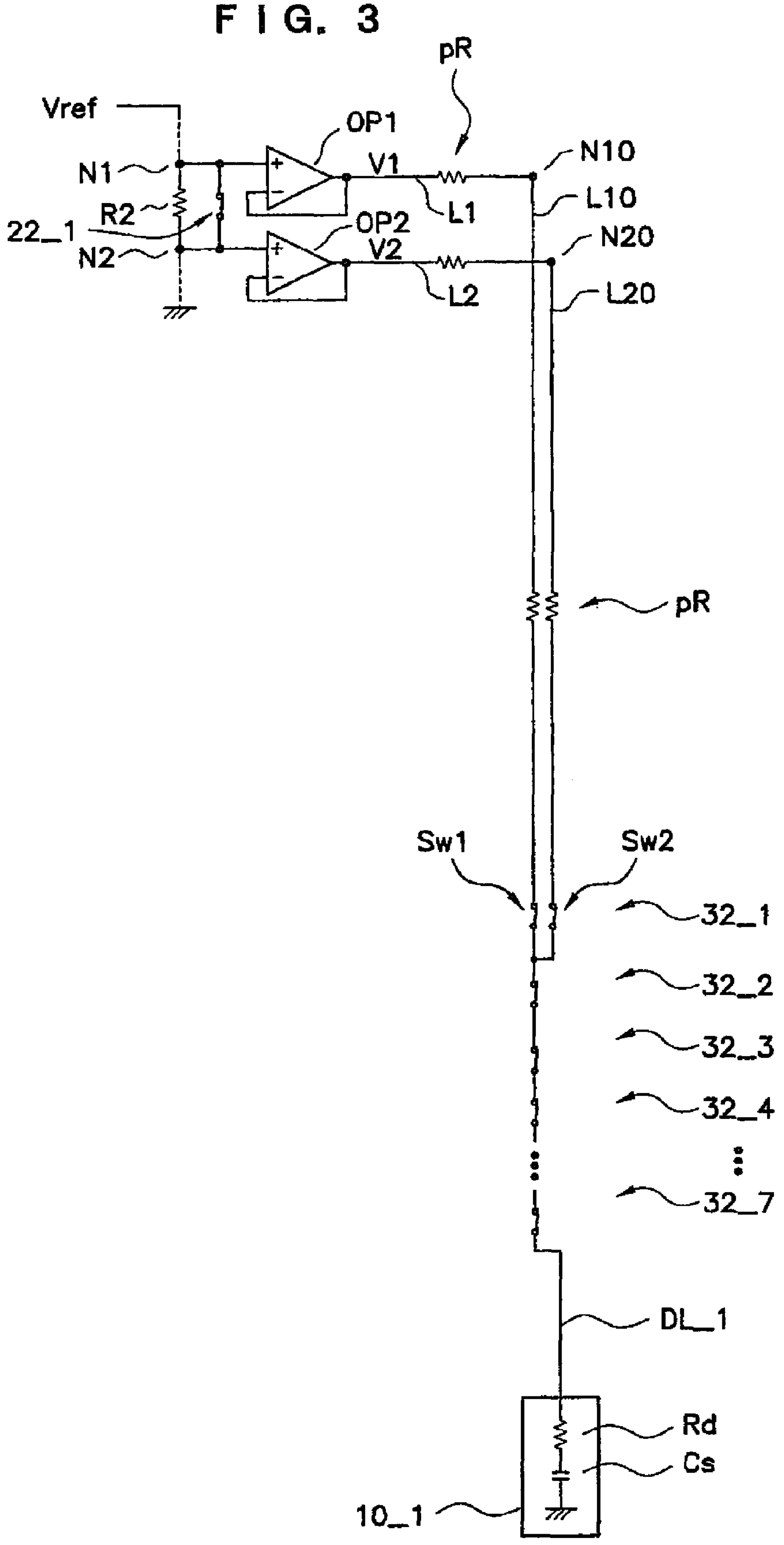
FIG. 3 is a drawing exemplifying an equivalent circuit at the time of supplying gradation potential to a pixel in the driving circuit relating to the first exemplary embodiment.

Operation of the driving circuit relating to the present exemplary embodiment will be described next with reference to FIG. 3 through FIG. 5. FIG. 3 is a drawing showing an equivalent circuit at the time when gradation potential V2 is supplied to pixel 10_1. FIG. 4 is a timing chart showing the operation at the time when the gradation potential V2 is supplied to the pixel 10_1. FIG. 5 is a drawing showing an equivalent circuit at the time when gradation potential V3 is supplied to the pixel 10_1.

When the gradation potential V2 is supplied as the target gradation potential to the pixel 10_1, the 7-bit data "0000001" is sent-out as display data from the control section 60 to the source driver 15. When this display data is received, at the switching element group 32 of the source driver 15, at all of the pairs of switching elements (SW1, SW2) of the switching element groups 32_2 through 32_7, the switching element SW1 short-circuits and the switching element SW2 opens. Further, at the pairs of switching elements (SW1, SW2) of the switching element group 32_1, the switching element SW1 opens and the switching element SW2 short-circuits.

Together with the starting of the writing period of the gradation potential V2, the control section 60 makes the enable signal EN be H level, and, by the switch control signal SC1, short-circuits the entire switching element group 32_1 corresponding to the low-order one bit (LSB) of the display data, regardless of the display data. In this way, at the switching element group 32_1, both switching elements of the pairs of switching elements (SW1, SW2) short-circuit. Further, together with the starting of the writing period of the gradation potential V2, the control section 60 short-circuits the switching element 22_1 within the switching element group 22 by the switch control signal SC2, such that the node N2 of the target gradation potential corresponding to the display data, and the node N1 of the gradation potential corresponding to the data at which only the low-order one bit (LSB) differs with respect to the display data, are connected.

Due to the above-described switching operations, in the initial first time period of the writing period of the gradation potential V2, the source driver 15 becomes an equivalent circuit such as shown in FIG. 3. As this equivalent circuit shows, at the switching element group 32_1, the pair of switching elements SW1, SW2 respectively connected to the lines L10, L20 both short-circuit, and the node N1 and the node N2 short-circuit.

Accordingly, in the first time period, the gradation potential V1 (the potential of the node N1), which is higher than the target gradation potential V2, is connected to the data line DL_1.

Further, in the first time period, at the line from the node N1 to the switching element group 32, the wiring path formed from the line L1, the node N10, and the line L10, and the wiring path formed from the line L2, the node N20, and the line L20, are structured in parallel. In this way, the parasitic resistance pR at the time when the gradation potential is sent-out to the data line DL_1 is lowered by about one-half as compared with a case in which the above-described short-circuit control mode is not carried out.

At the control section 60, in the second time period when the enable signal EN switches from H level to L level, the above-described short-circuit control mode is not carried out (is cancelled). Namely, at the switching element group 32_1 corresponding to the low-order one bit (LSB) of the display data, at all of the pairs of switching elements, the switching element SW1 is opened (the switching element SW2 remains short-circuited as is). In this way, in the second time period, the switching element group 32 is in opened/closed states corresponding to the display data "0000001", and the target gradation potential V2 is connected to the data line DL_1. Further, in the second time period, the switching element 22_1 is opened.

Accordingly, in the second time period, the line from the node N2 to the switching element group 32 becomes a structure of a single wiring path formed from the line L2, the node N20, and the line L20, from the parallel structure in the first time period.

Figure 4A:
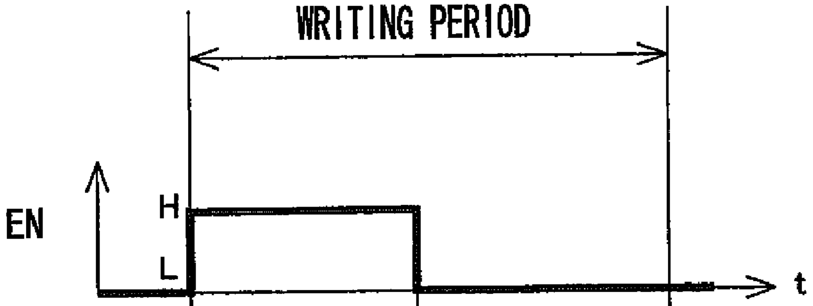
FIGS. 4A and 4B are timing charts showing operation at the time of supplying gradation potential to a pixel in the driving circuit relating to the first exemplary embodiment.
Figure 4B:
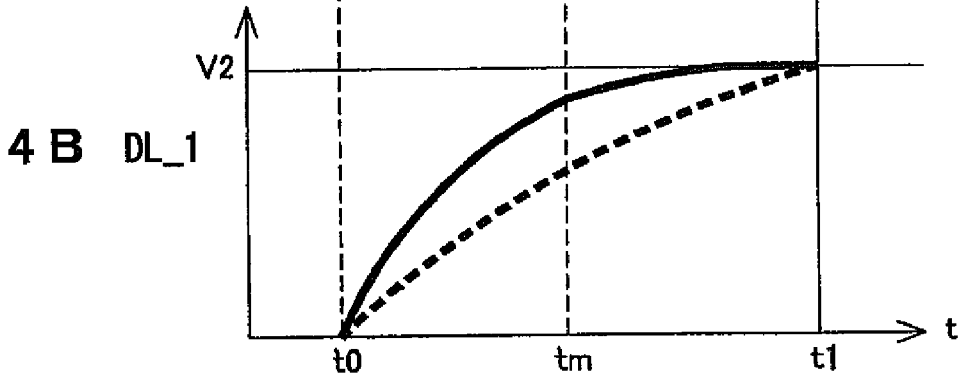
Figure 5:
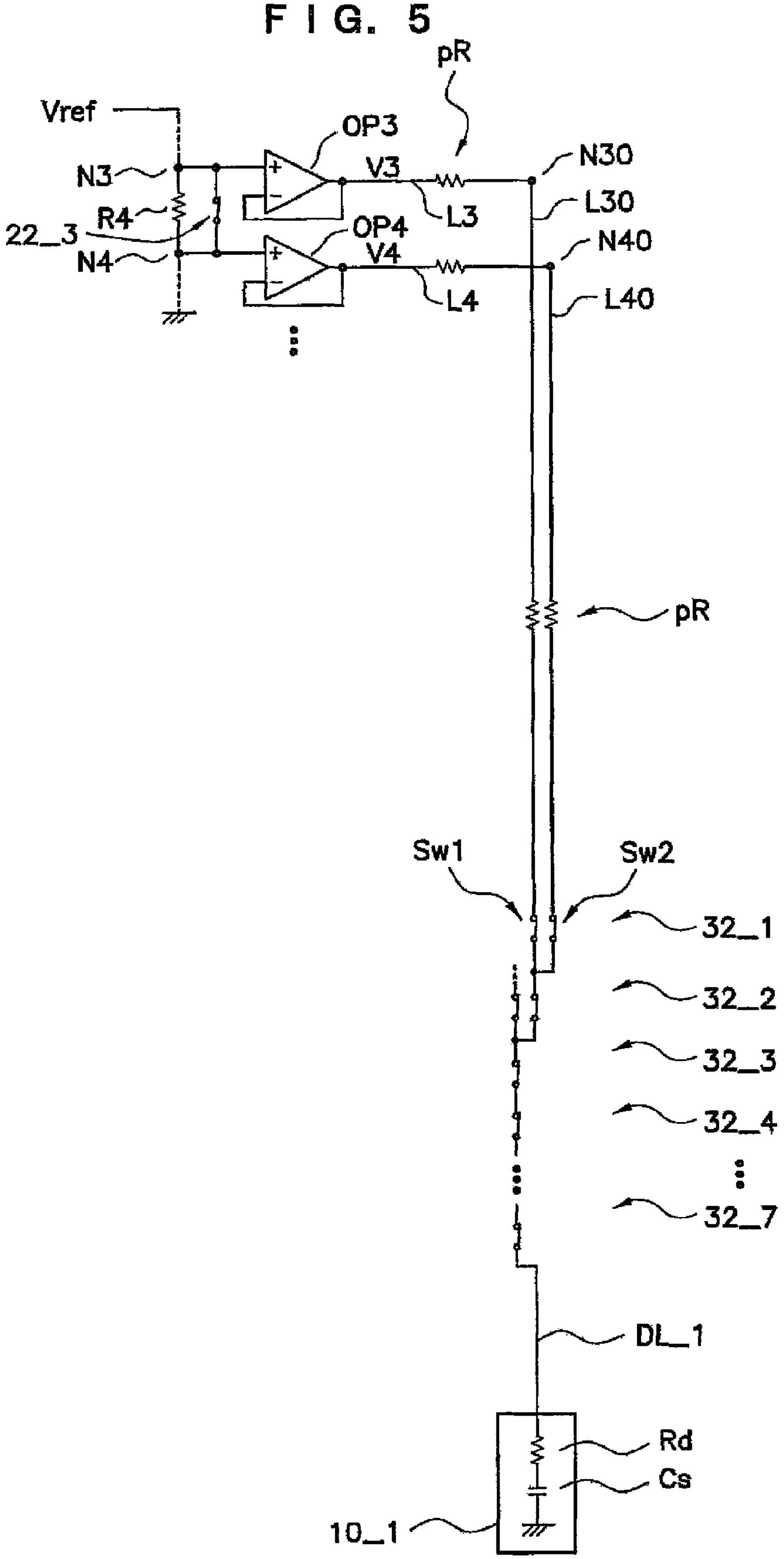
FIG. 5 is a drawing exemplifying an equivalent circuit at the time of supplying gradation potential to a pixel in the driving circuit relating to the first exemplary embodiment.

FIGS. 4A and 4B are drawings showing the transient response at the time when the gradation potential V2 is supplied to the pixel 10_1 during a given writing period. FIG. 4A shows the enable signal EN, and FIG. 4B shows the potential (pixel potential) of the data line DL_1. In FIG. 4B, the case of the driving circuit of the present exemplary embodiment is shown by the solid line, and the case of a conventional driving circuit is shown by the dashed line.

Note that, in FIG. 4B, the pixel potential fluctuates with 0 V being the starting point. In FIG. 4B, 0 V is made to be the starting point for convenience, for easier understanding of the transient response of the pixel potential in accordance with the present exemplary embodiment. However, in an actual liquid crystal display device, alternating current driving, which inverts, at a period of 1 F (one frame period) or the like and with respect to the common potential, the potential supplied to the pixel, is carried out. Therefore, usually, the pixel potential at the start of the writing period in continuous display operation changes moment by moment.

In FIGS. 4A and 4B, during the first time period from time t0 to time tm, as shown in FIG. 4A, the enable signal EN becomes H level, and the control section 60 carries out the short-circuit control mode. In the first time period, as described above, the gradation potential V1 which is higher than the target gradation potential V2 is connected to the data line DL_1, and the parasitic resistance pR when the gradation potential is sent-out to the data line DL_1 is lowered by about one-half as compared with a case in which the short-circuit control mode is not carried out. Namely, the time constant of the CR circuit, which is structured by the hold capacitor Cs of the pixel 10_1 and the parasitic resistor pR, decreases by about one-half as compared with a case in which the short-circuit control mode is not carried out. Further, in the transient response in the first time period, the potential of the data line DL_1 rises from time t0 toward the gradation potential V1 which is higher than the gradation potential V2 which fundamentally should be supplied. Therefore, at the time tm when the enable signal EN changes from H level to L level, the potential of the data line DL_1 reaches a potential level which is near the gradation potential V2.

Referring to FIG. 4B, in the driving circuit relating to the present exemplary embodiment, the change in the potential from time t0 to time tm is steep as compared with the conventional driving circuit.

During the second time period from time tm to time t1, the short-circuit control mode is cancelled, but the potential of the data line DL_1 reaches a potential level near the gradation potential V2 at the point in time of time tm. Therefore, within a relatively short time period from time tm, the potential of the data line DL_1 reaches the target gradation potential V2.

Next, operation at the time when the gradation potential V3 is supplied to the pixel 10_1 will be described.

When the gradation potential V3 is supplied as the target gradation potential to the pixel 10_1, the 7-bit data "00000010" is sent-out as display data from the control section 60 to the source driver 15. When this display data is received, at the switching element group 32 of the source driver 15, at all of the pairs of switching elements (SW1, SW2) of the switching element groups 32_1 and 32_3 through 32_7, the switching element SW1 short-circuits and the switching element SW2 opens. Further, at the pairs of switching elements (SW1, SW2) of the switching element group 32_2, the switching element SW1 opens and the switching element SW2 short-circuits.

Together with the starting of the writing period of the gradation potential V3, the control section 60 makes the enable signal EN be H level, and, by the switch control signal SC1, short-circuits the entire switching element group 32_1 corresponding to the low-order one bit (LSB) of the display data, regardless of the display data. In this way, at the switching element group 32_1, both switching elements of the pairs of switching elements (SW1, SW2) short-circuit. Further, together with the starting of the writing period of the gradation potential V3, the control section 60 short-circuits the switching element 22_3 within the switching element group 22 by the switch control signal SC2, such that the node N3 of the target gradation potential corresponding to the display data, and the node N4 of the gradation potential corresponding to the data at which only the low-order one bit (LSB) differs with respect to the display data, are connected.

Due to the above-described switching operations, in the initial first time period of the writing period of the gradation potential V3, the source driver 15 becomes an equivalent circuit such as shown in FIG. 5. As this equivalent circuit shows, at the switching element group 32_1, the pair of switching elements SW1, SW2 respectively connected to the lines L30, L40 both short-circuit, and the node N3 and the node N4 short-circuit.

Accordingly, in the first time period, because the gradation potential V4 at the node N4 is lower than the gradation potential V3, the target gradation potential V3 is connected to the data line DL_1.

Further, in the first time period, at the line from the node N3 to the switching element group 32, the wiring path formed from the line L3, the node N30, and the line L30, and the wiring path formed from the line L4, the node N40, and the line L40, are structured in parallel. In this way, the parasitic resistance pR at the time when the gradation potential is sent-out to the data line DL_1 is lowered by about one-half as compared with a case in which the above-described short-circuit control mode is not carried out.

At the control section 60, in the second time period when the enable signal EN switches from H level to L level, the above-described short-circuit control mode is not carried out (is cancelled). Namely, at the switching element group 32_1 corresponding to the low-order one bit (LSB) of the display data, at all of the pairs of switching elements, the switching element SW2 is opened (the switching element SW1 remains short-circuited as is). In this way, in the second time period, the switching element group 32 is in opened/closed states corresponding to the display data "0000010", and the gradation potential V3 is connected to the data line DL_1. Further, in the second time period, the switching element 22_3 is opened.

Accordingly, in the second time period, the line from the node N2 to the switching element group 32 becomes a structure of a single wiring path formed from the line L3, the node N30, and the line L30, from the parallel structure in the first time period.

When the gradation potential V3 is supplied to the pixel 10_1, in the first time period, the target gradation potential V3 is connected to the data line DL_1 as is, which is different than the case in which the gradation potential V2 is supplied to the pixel 10_1. However, the parasitic resistance pR, at the time when the gradation potential is sent-out to the data line DL_1, falls by about one-half as compared with a case in the which the above-described short-circuit control mode is not carried out. Therefore, the time constant of the CR circuit, which is structured by the hold capacitor Cs of the pixel 10_1 and the parasitic resistor pR, decreases by about one-half as compared with a case in which the short-circuit control mode is not carried out. Accordingly, at the point in time when the second time period starts, the potential of the data line DL_1 reaches a potential level which is near the target gradation potential V3. Within a relatively short time period from the start of the second time period, the potential of the data line DL_1 reaches the target gradation potential V3.

Operations in cases in which the gradation potentials V2, V3 are supplied to the pixel 10_1 have been described above, and cases in which the other gradation potentials V4 through V128 are supplied can be described similarly.

As described above, in accordance with the driving circuit relating to the present exemplary embodiment, in a first time period during the data writing period, the control section 60 short-circuits a node (first node) which is set to a target gradation potential and a node (second node) which is adjacent to the first node, and makes it such that a line (second line) between the second node and the output terminal is connected in parallel to a line (first line) between the first node and the output terminal. Further, in the second time period which follows the first time period, the control section 60 controls the switching element groups (32, 22) so as to cancel the short-circuiting between the first node and the second node and such that the second line is not connected in parallel to the first line.

Accordingly, in a short time in the first time period, the potential of the pixel which is the object of writing reaches a potential level which is near to the target potential, and therefore, the overall data writing period can be shortened. Thus, the data writing time can be shortened even in cases in which the LCD panel is large-sized and the wiring resistance in the driving circuit increases.

Second Exemplary Embodiment

A second exemplary embodiment of a driving circuit of the present invention will be described next. In the driving circuit relating to the present exemplary embodiment, the structure of the switching element group in the gradation setting section of the source driver, and the contents of the control of the control section, are different than in the first exemplary embodiment.

Figure 6:
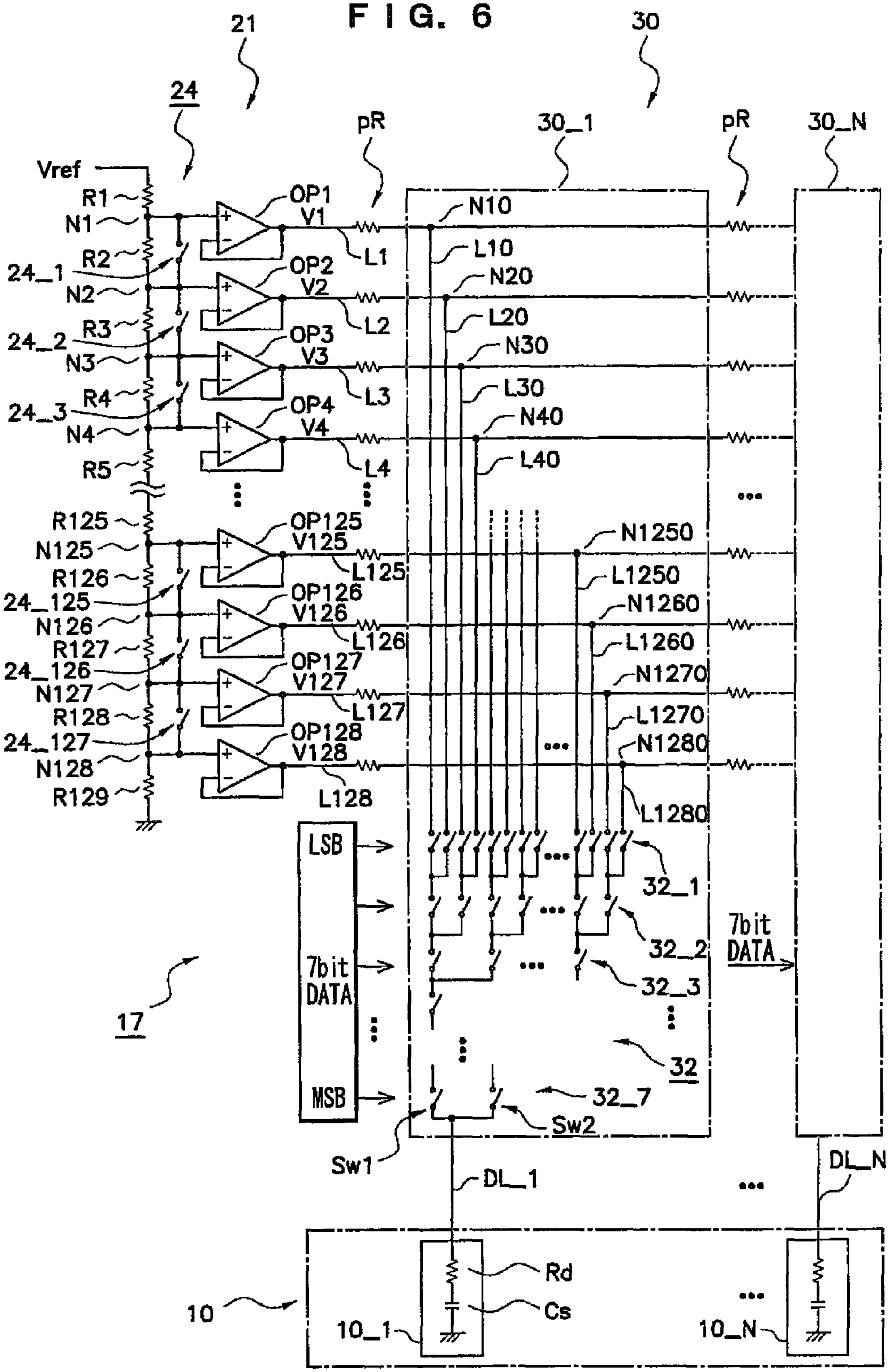
FIG. 6 is a drawing exemplifying a partial circuit structure of a source driver structuring a driving circuit relating to a second exemplary embodiment.

FIG. 6 is a circuit diagram showing the structure of a source driver in the present exemplary embodiment. Regions which are the same as those shown in FIG. 2 are denoted by the same reference numerals, and repeat description thereof is not carried out.

(Structure of Source Driver)

A specific example of the circuit structure of a source driver 17 in the present exemplary embodiment will be described next with reference to FIG. 6.

Differently than the previously-described source driver 15 (see FIG. 2), the source driver 17 has a gradation setting section 22 which includes a switching element group 24.

As shown in FIG. 6, the switching element group 24 includes switching element 24_1 provided between node N1 and node N2, switching element 24_2 provided between node N2 and node N3, switching element 24_3 provided between node N3 and node N4, . . . , and switching element 22_127 provided between node N127 and node N128. Namely, the switching elements are provided between all of the adjacent nodes.

The opening and closing of the respective switching elements of the switching element group 24 are controlled by the switch control signal SC2 from a control section 62 in the present exemplary embodiment.

In the source driver 17, structures other than the switching element group 24 are the same as those of the source driver 15.

(Contents of Control by Control Section)

The contents of the controlling of the source driver 17 by the control section 62 (not illustrated) of the present exemplary embodiment will be described next.

In a conventional driving circuit, during the period of the supply of the gradation potential by the data line (the data writing period), the open/closed states of the switching element group 32 are fixed in accordance with the display data. However, in an initial time period (first time period) in the data writing period, the control section 62 in the present exemplary embodiment sets the switching element group 32 in open/closed states corresponding to the display data, and, in addition, short-circuits (sets in closed states) the entire switching element groups 32_1, 32_2 corresponding to the low-order two bits of the display data by the switch control signal SC1 regardless of the display data.

Further, in the first time period, the control section 62 short-circuits the switching elements in the switching element group 24 by the switch control signal SC2, so that the node of the target gradation potential corresponding to the display data, and the nodes of the gradation potentials corresponding to all of the data in which only the low-order two bits differ from the display data, are connected. For example, in a case in which the target gradation potential corresponding to the display data is V3, the switching elements 24_1, 24_2, 24_3 within the switching element group 24 are all short-circuited, such that the node N3 corresponding to the target gradation potential V3, and the nodes N1, N2, N4 of the gradation potentials corresponding to all of the data at which only the low-order two bits differ from the display data, are all connected. In this way, the nodes N1 through N4 all become the same potential.

Note that, in the following description, the above-described switching control which short-circuits the switching elements other than the switching elements which are opened and closed in accordance with the display data, is, in the same way as in the first exemplary embodiment, called the "short-circuit control mode". This short-circuit control mode is carried out only in the first time period.

In the time period (the second time period) after the first time period and during the data writing period, the control section 62 cancels the short-circuiting of the first time period. Accordingly, in the second time period, the short-circuit control mode is not carried out, and the switching element group 32 is set in open and closed states corresponding to the display data.

The control section 62 decides on the switching from the first time period to the second time period in the data writing period, in accordance with the change in the level of the internal enable signal EN. Namely, in the first time period in which the enable signal EN is high level (H level), the above-described short circuit control mode is carried out. During the second time period, which is from the point in time when the enable signal EN changes from high level to low level (L level), the above-described short-circuit control mode is not carried out.

(Operation of Driving Circuit)

Figure 7:
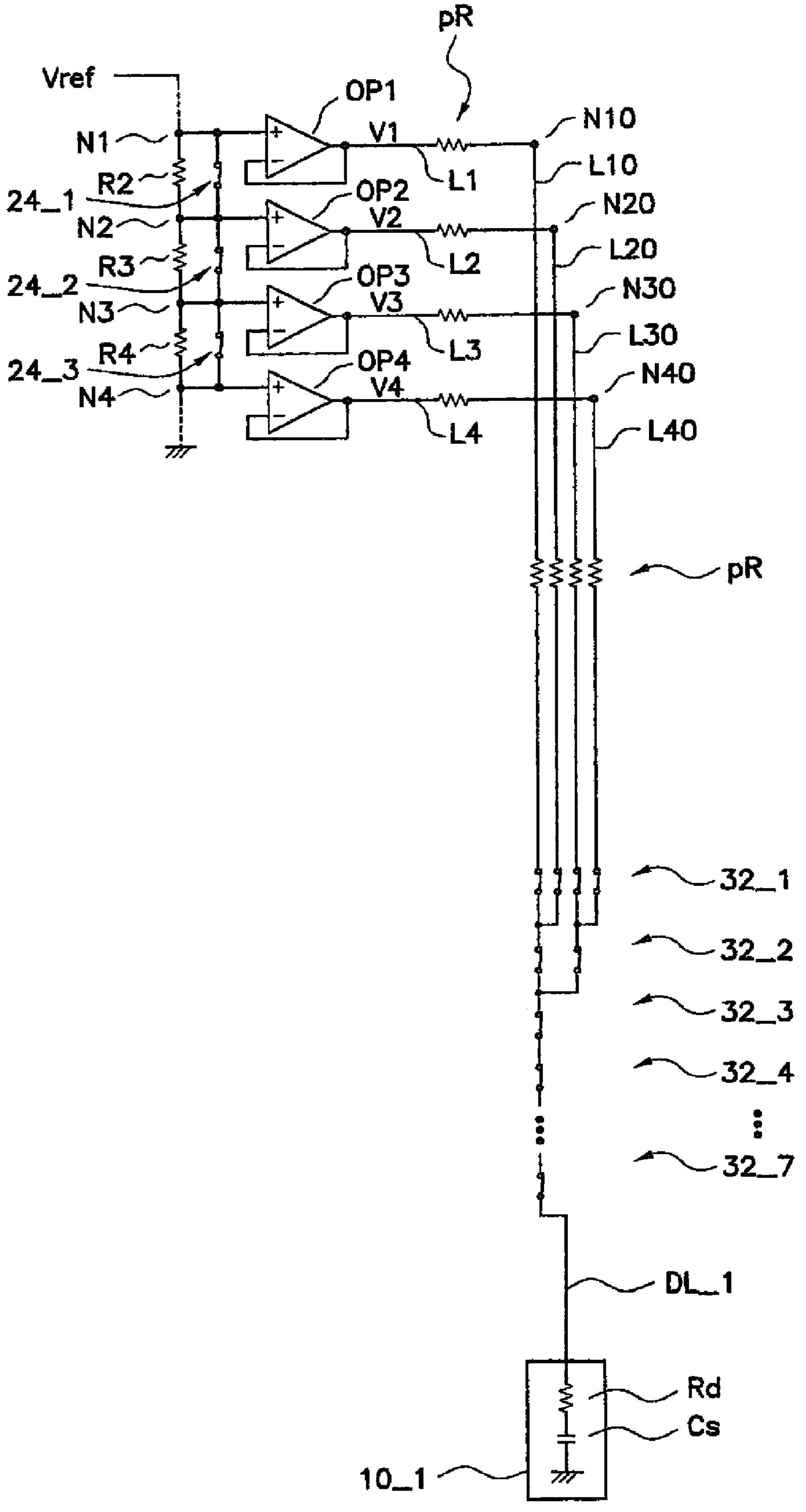
FIG. 7 is a drawing exemplifying an equivalent circuit at the time of supplying gradation potential to a pixel in the driving circuit relating to the second exemplary embodiment.

Operation of the driving circuit relating to the present exemplary embodiment will be described next with reference to FIG. 7. FIG. 7 is a drawing showing an equivalent circuit at the time when the gradation potential V3 is supplied to the pixel 10_1.

When the gradation potential V3 is supplied as the target gradation potential to the pixel 10_1, the 7-bit data "0000010" is sent-out as display data from the control section 62 to the source driver 17. When this display data is received, at the switching element group 32 of the source driver 17, at all of the pairs of switching elements (SW1, SW2) of the switching element groups 32_1 and 32_3 through 32_7, the switching element SW1 short-circuits and the switching element SW2 opens. Further, at the pairs of switching elements (SW1, SW2) of the switching element group 32_2, the switching element SW1 opens and the switching element SW2 short-circuits.

Together with the starting of the writing period of the gradation potential V3, the control section 62 makes the enable signal EN be H level, and, by the switch control signal SC1, short-circuits the entire switching element groups 32_1, 32_2 corresponding to the low-order two bits of the display data, regardless of the display data. In this way, at the switching element groups 32_1, 32_1, both switching elements of the pairs of switching elements (SW1, SW2) short-circuit. Further, together with the starting of the writing period of the gradation potential V3, the control section 62 short-circuits the switching elements 24_1, 24_2, 24_3 within the switching element group 24 by the switch control signal SC2, such that the node N3 of the target gradation potential corresponding to the display data, and the nodes N1, N2, N4 of the gradation potentials corresponding to all of the data at which only the low-order two bits differ with respect to the display data, are all connected.

Due to the above-described switching operations, in the initial first time period of the writing period of the gradation potential V3, the source driver 17 becomes an equivalent circuit such as shown in FIG. 7. As this equivalent circuit shows, at the switching element group 32_1, the pairs of switching elements SW1, SW2 respectively connected to the lines L10, L20, L30, L40 both short-circuit, and the nodes N1, N2, N3, N4 short-circuit.

Accordingly, in the first time period, the gradation potential V1 (the potential of the node N1), which is higher than the target gradation potential V3, is connected to the data line DL_1.

Further, in the first time period, at the line from the node N1 to the switching element group 32, the wiring path formed from the line L1, the node N10 and the line L10, and the wiring path formed from the line L2, the node N20 and the line L20, the wiring path formed from the line L3, the node N30 and the line L30, and the wiring path formed from the line L4, the node N40 and the line L40, are structured in parallel. In this way, the parasitic resistance pR at the time when the gradation potential is sent-out to the data line DL_1 is lowered by about one-quarter as compared with a case in which the above-described short-circuit control mode is not carried out. 58

At the control section 62, in the second time period when the enable signal EN switches from H level to L level, the above-described short-circuit control mode is not carried out (is cancelled). Namely, at the switching element groups 32_1, 32_2 corresponding to the low-order two bits of the display data, at all of the pairs of switching elements, the switching element SW1 is opened (the switching element SW2 remains short-circuited as is). In this way, in the second time period, the switching element group 32 is in opened/closed states corresponding to the display data "0000010", and the gradation potential V2 is connected to the data line DL_1. Further, in the second time period, the switching elements 24_1, 24_2, 24_3 are opened.

Accordingly, in the second time period, the line from the node N2 to the switching element group 32 becomes a structure of a single wiring path formed from the line L2, the node N20, and the line L20, from the parallel structure in the first time period.

As described above, in the driving circuit of the present exemplary embodiment, in the first time period, the gradation potential V1 which is higher than the target gradation potential V3 is connected to the data line DL_1, and the parasitic resistance pR at the time when the gradation potential is connected to the data line DL_1 falls by about one-quarter as compared with a case in the which the above-described short-circuit control mode is not carried out. Namely, the time constant of the CR circuit, which is structured by the hold capacitor Cs of the pixel 10_1 and the parasitic resistor pR, decreases by about one-quarter as compared with a case in which the short-circuit control mode is not carried out. Further, in the first time period, because the potential of the data line DL_1 changes transiently toward the gradation potential V1 which is higher than the target gradation potential V3, it reaches a potential level near the gradation potential V3 in an extremely short time period.

Then, in the second time period, the short-circuit control mode is cancelled. However, the potential of the data line DL_1 reaches a potential level near the target gradation potential V3 at the point in time when the second time period starts. Therefore, within a relatively short time period thereafter, the potential of the data line DL_1 reaches the target gradation potential V3.

As described above, in accordance with the driving circuit relating to the present exemplary embodiment, the pixel potential can be made to reach the target gradation potential in an even shorter time than in the driving circuit of the first exemplary embodiment.

Note that the present exemplary embodiment can be expanded so as to, in the first time period, short-circuit all of the switching element groups corresponding to bits which are greater than or equal to the low-order N (N>3) bits of the display data, regardless of the display data. In this case, the corresponding switching elements in the switching element group within the gradation setting section are short-circuited such that the node of the target gradation potential corresponding to the display data, and the nodes of the gradation potentials corresponding to all of the data in which only the low-order N bits differ from the display data, are connected.

In this way, in the first time period, a gradation potential which is fairly higher than the gradation potential which fundamentally should be supplied is provided to the data line, and the parasitic resistance pR at the time of connecting the gradation potential to the data line decreases by about 1/N as compared with a case in which the short-circuit control mode is not carried out. Namely, the time constant of the CR circuit, which is structured by the hold capacitor Cs of the pixel 10_1 and the parasitic resistor pR, decreases by about 1/N as compared with a case in which the short-circuit control mode is not carried out. Further, in the first time period, because the potential of the data line changes transiently toward a gradation potential which is fairly higher than the gradation potential which fundamentally should be supplied, the potential of the data line can be made to reach a potential level which is near the target gradation potential in a very short time period.

When the present exemplary embodiment is expanded in this way, in the first time period, it is not absolutely necessary that the node of the gradation potential corresponding to the display data, and the nodes of the gradation potentials corresponding to all of the data in which only the low-order N bits differ from the display data, be made to be the same potential. A target attained potential of the data line at the point in time when the first time period ends may be set, and, if this target attained potential is satisfied, the node of the gradation potential corresponding to the display data, and the nodes of the gradation potentials corresponding to some of the data at which only the low-order N bits differ from the display data, can be made to be the same potential.

For example, in the example shown in FIG. 7, in the first time period, the switching elements 24_1, 24_2, 24_3 all short-circuit, and the gradation potential V1 which is fairly higher than the target gradation potential V3 is provided to the data line DL_1. However, in a case in which the target attained potential can be reached by providing the gradation potential V2 to the data line DL_1 in the first time period, the switching elements 24_2, 24_3 can be short-circuited and the switching element 24_1 can be left open as is.

By controlling the switching elements in this way, ringing, which may arise in the second time period due to the potential of the data line at the point in time when the first time period ends becoming too much higher than the target gradation potential, and the like can be prevented.

Further, in the driving circuits of the above-described respective exemplary embodiments, because the gradation potentials are short-circuited between different nodes, there is the possibility that a large short-circuit current will flow between the nodes accompanying this short-circuiting. However, such short-circuit current can be suppressed by setting the on-resistances of the switching elements appropriately. Hereinafter, this point will be described by referring to the example shown in FIG. 8.

Figure 8:
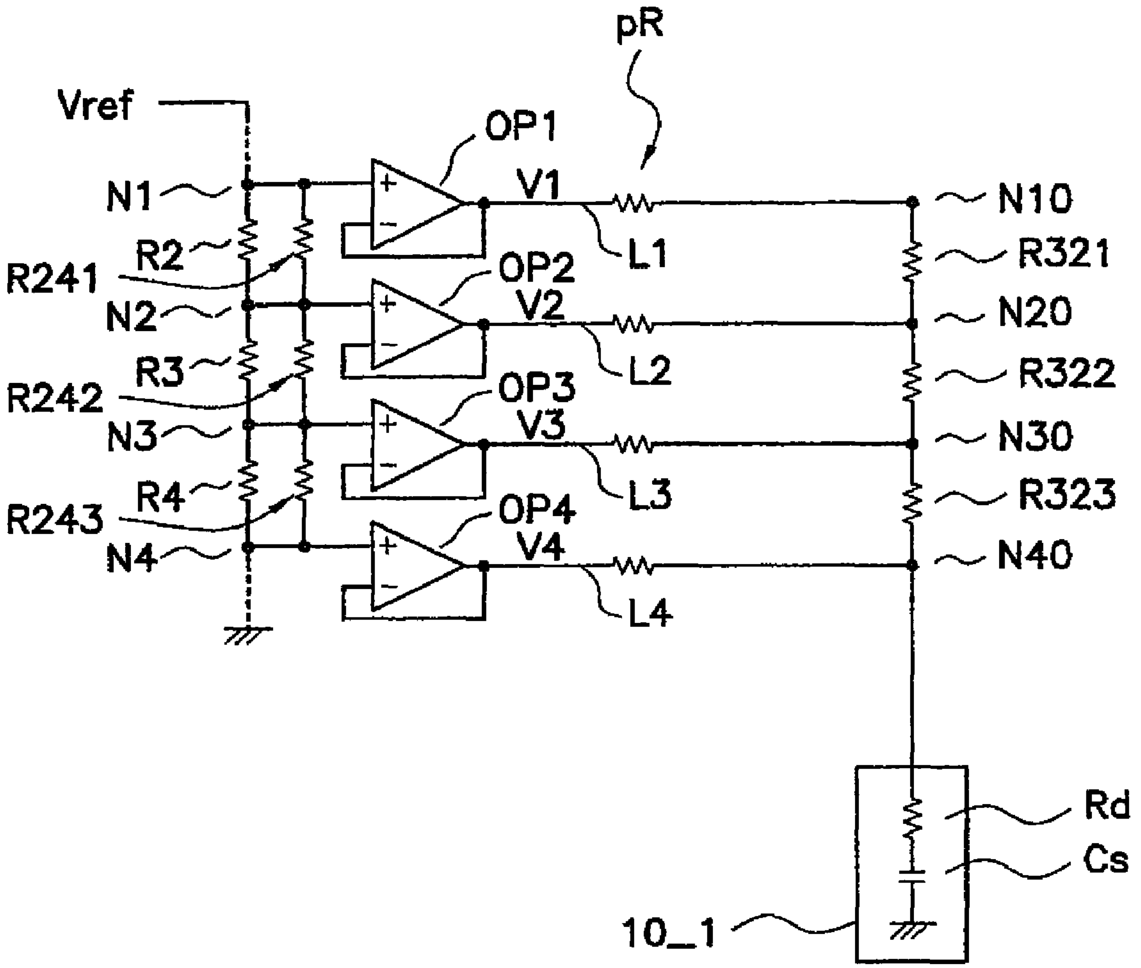
FIG. 8 is a circuit diagram of an equivalent circuit in a short-circuit control mode in the driving circuit relating to the second exemplary embodiment.

FIG. 8 is a circuit diagram showing, in the driving circuit of the second exemplary embodiment, the equivalent circuit in the short-circuit control mode, including on-resistors of the switching elements. In the same way as in FIG. 7, FIG. 8 is a circuit diagram of the equivalent circuit at the time when the gradation potential V3 is supplied to the pixel 10_1.

In FIG. 8, the on-resistors of the switching elements 24_1, 24_2, 24_3 are resistors R241, R242, R243, respectively. Further, as is clear by referring to FIG. 7 as well, a resistor R321 corresponds to the on-resistors of two switching elements of the switching element group 32. Similarly, a resistor R322 corresponds to the on-resistors of four switching elements in the switching element group 32, and a resistor R323 corresponds to the on-resistors of two switching elements in the switching element group 32.

In FIG. 8, when (the combined resistor of the resistor R2 and the resistor R241) and the resistor R321 are made to be the same, the voltage between node N1 and node N2 and the voltage between node N10 and node N20 can be made to be the same. Therefore, it is possible to make it such that hardly any short-circuit current flows between the adjacent operational amplifiers OP1, OP2. Similarly, when the combined resistor of the resistor R3 and the resistor R242, and the resistor R322 are made to be the same, the voltage between node N2 and node N3 and the voltage between node N20 and node N30 can be made to be the same. Therefore, it is possible to make it such that hardly any short-circuit current flows between the adjacent operational amplifiers OP2, OP3. Similarly, when the combined resistor of the resistor R4 and the resistor R243, and the resistor R323 are made to be the same, the voltage between node N3 and node N4 and the voltage between node N30 and node N40 can be made to be the same. Therefore, it is possible to make it such that hardly any short-circuit current flows between the adjacent operational amplifiers OP3, OP4.

Exemplary embodiments of the present invention have been described above, but the specific structure of the present invention is not limited to these exemplary embodiments, and changes in design, other modifications and the like which do not depart from the gist of the present invention are also included.

What is claimed is:

1. A driving circuit for outputting, from output terminals, gradation potentials corresponding to display data, the driving circuit comprising:

a gradation setting circuit which is configured to set, on the basis of a reference potential, a plurality of respectively different gradation potentials at a plurality of nodes;

a plurality of amplifiers provided at the plurality of nodes, respectively;

potential selecting circuits provided respectively in correspondence with the output terminals, wherein each potential selection circuit is configured to select, during a data writing period and from among the plurality of gradation potentials, a target gradation potential corresponding to the display data, and to output the target gradation potential from a respective amplifier to the output terminal; and a control circuit configured to, (a) during a first time period of the data writing period, short-circuit a first node set to the target gradation potential and a second node adjacent to the first node, and to connect in parallel a second line between the second node and the output terminal to a first line between the first node and the output terminal, and, (b) during a second time period which follows the first time period, to cancel the short circuit between the first node and the second node and the parallel connection of the second line to the first line.

* * * * *